(12) United States Patent
Embach et al.

(10) Patent No.: US 7,798,548 B2
(45) Date of Patent: Sep. 21, 2010

(54) SOFT COMPOSITE TRIM PANEL FOR A VEHICLE INTERIOR

(75) Inventors: James T. Embach, Rochester Hills, MI (US); Wade W. Bryant, Grosse Pointe Farms, MI (US); Simon Cox, Henley-In-Arden (GB); Benjamin Walsh, Ampthill (GB); Pierre R. Webster, Beverly Hills, MI (US); Therese A. Tant, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 306 days.

(21) Appl. No.: 11/952,415

(22) Filed: Dec. 7, 2007

(65) Prior Publication Data

US 2008/0157553 A1 Jul. 3, 2008

Related U.S. Application Data

(60) Provisional application No. 60/883,276, filed on Jan. 3, 2007.

(51) Int. Cl.
B60R 7/04 (2006.01)

(52) U.S. Cl. .................. 296/37.8; 296/1.08; 296/37.12; 296/37.13; 296/37.15; 296/37.16; 296/146.7; 296/24.34

(58) Field of Classification Search ................. 296/191, 296/37.1, 37.8, 37.17, 37.13, 37.15, 37.16, 296/146.7, 1.08, 24.34, 37.12
See application file for complete search history.

(56) References Cited

U.S. PATENT DOCUMENTS

| | | | | |
|---|---|---|---|---|
| 4,172,918 A | * | 10/1979 | Doerer | 428/174 |
| 5,972,492 A | * | 10/1999 | Murakami et al. | 428/318.8 |
| 5,976,295 A | * | 11/1999 | Ang | 156/219 |
| 6,657,158 B1 | * | 12/2003 | Skelly et al. | 219/121.71 |
| 6,660,195 B2 | * | 12/2003 | Usui et al. | 264/46.4 |
| 7,318,498 B2 | * | 1/2008 | Woodman et al. | 181/290 |
| 2005/0224165 A1 | * | 10/2005 | Wang | 156/244.27 |
| 2006/0145506 A1 | * | 7/2006 | Braun et al. | 296/70 |
| 2006/0193122 A1 | * | 8/2006 | Chang | 362/103 |
| 2006/0218758 A1 | * | 10/2006 | Chang | 24/431 |
| 2008/0007940 A1 | * | 1/2008 | Cheng | 362/103 |
| 2008/0032102 A1 | * | 2/2008 | Monk et al. | 428/213 |

(Continued)

FOREIGN PATENT DOCUMENTS

JP 2000142253 A * 5/2000

*Primary Examiner*—Jason S Morrow
(74) *Attorney, Agent, or Firm*—Quinn Law Group, PLLC

(57) ABSTRACT

A flexible trim panel attaches to a surface of a vehicle interior and includes a compression-molded thermoplastic foam layer and a textile fabric or synthetic leather layer, such as expanded polyurethane or PVC material. The panel has a compression-molded surface feature in an inner and outer layer, and may have a pocket and a zipper closure. An LED, EL ribbon, or other lighting device is connected to a transparent zipper closure. A composite trim panel is also provided having a compression-molded EVA foam layer and an outer layer. The layers form a composite piece that is attachable to a seat, an instrument panel, or a door. A vehicle interior includes a seat, an instrument panel, a door, and at least one composite trim panel. A transparent closure device connects to the composite trim panel, and a lighting device having a variable property is positioned adjacently to the transparent closure device.

19 Claims, 4 Drawing Sheets

U.S. PATENT DOCUMENTS

| | | |
|---|---|---|
| 2008/0050575 A1* | 2/2008 | Park .......................... 428/304.4 |
| 2008/0073813 A1* | 3/2008 | Smith et al. ................. 264/266 |
| 2008/0136144 A1* | 6/2008 | Spahr et al. ............... 280/728.3 |
| 2009/0015038 A1* | 1/2009 | Marx et al. .................. 296/214 |
| 2009/0085237 A1* | 4/2009 | Wolgamott et al. ........ 264/40.5 |

* cited by examiner

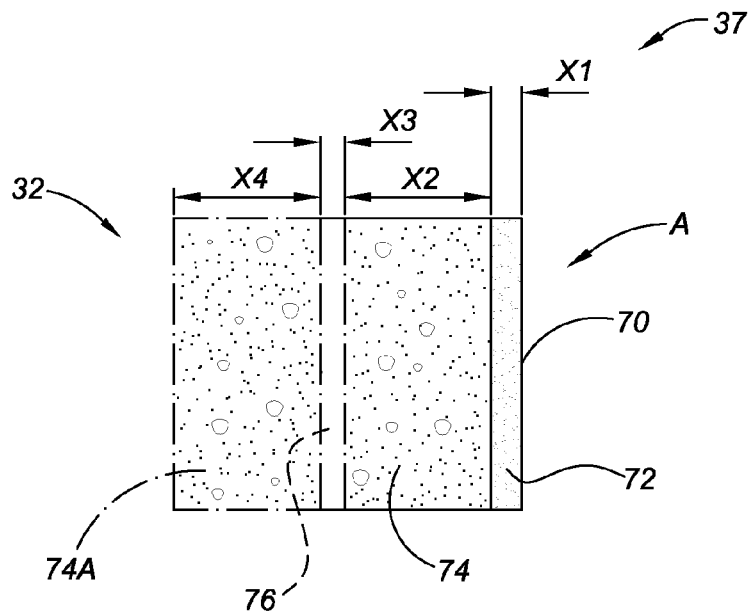
FIG. 4
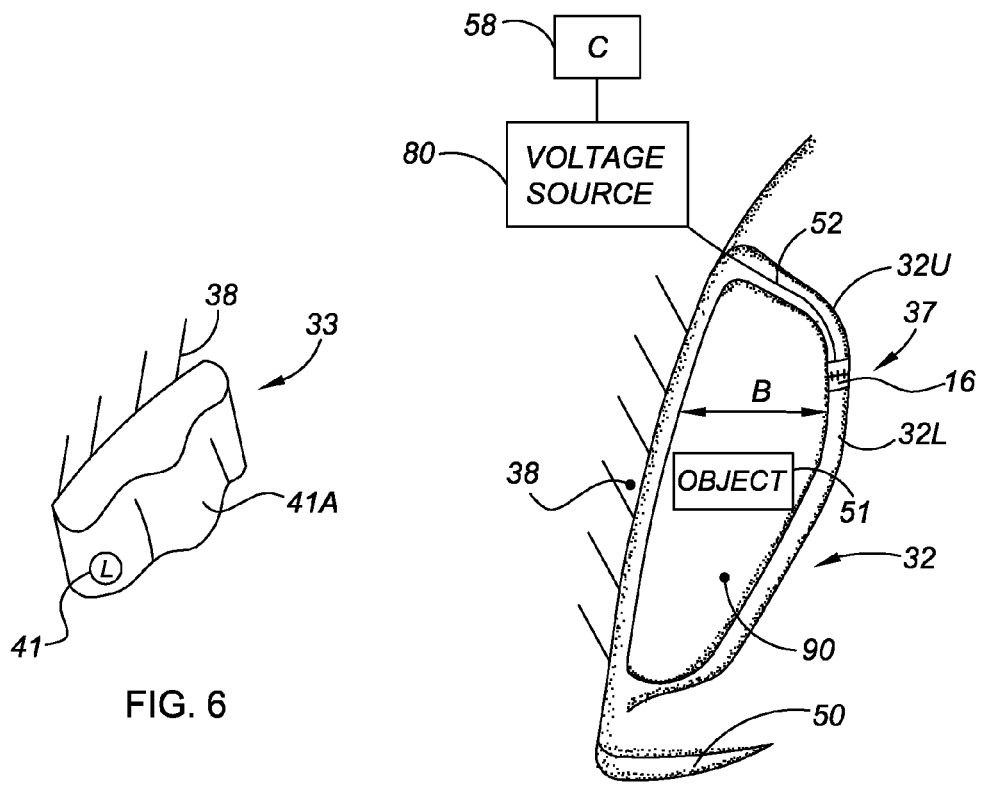
FIG. 6
FIG. 5

SOFT COMPOSITE TRIM PANEL FOR A VEHICLE INTERIOR

CLAIM OF PRIORITY

This application claims priority to U.S. Provisional Patent Application No. 60/883,276, filed on Jan. 3, 2007, which is hereby incorporated by reference in its entirety.

TECHNICAL FIELD

The present invention relates generally to a soft molded panel for use in a vehicle interior, and in particular to a soft vehicle trim panel constructed of a compression-molded composite of ethylene vinyl acetate (EVA) foam or other suitable foam and an outer layer of fabric or other suitable thermoplastic upholstery material.

BACKGROUND OF THE INVENTION

A vehicle interior contains various trim panels, which may be attached to or formed integrally with various surfaces of the vehicle interior, such as a door panel, an instrument panel, and/or a seat panel. Trim panels are usually constructed from materials that are complimentary to the overall design of the vehicle. For example, vehicle seats may be upholstered using natural leather in highly visible locations or "show surfaces" of the seat, while synthetic or lower grade natural leather is used in less visible locations. The trim panels used within an instrument panel or on a door panel may be constructed in part from molded plastic or stamped metal, which may in turn be padded and/or upholstered using weather-resistant synthetic materials.

Within the instrument panel, glove compartments and other vehicle storage consoles are generally constructed using substantially rigid materials, such as molded plastic, although they may be trimmed with padded leather or vinyl to present a finished look or a desired aesthetic appearance. Other vehicle storage consoles are sized and shaped to conveniently hold objects such as gloves, maps, and vehicle service manuals. Additional storage may be provided elsewhere within the interior of the vehicle, for example via open storage wells/map pockets formed on or within the door panels. As with a glove compartment, such map pockets may be formed from molded plastic or another substantially rigid material, and shaped or contoured in such a manner as to blend aesthetically with the door and the remainder of the vehicle interior.

SUMMARY OF THE INVENTION

Accordingly, a composite trim panel is provided for use in a vehicle interior. The composite trim panel includes at least one inner layer constructed of a thermoplastic foam material, and an outer layer forming an appearance surface. The inner layer and the outer layer are compression-molded together to form a composite trim piece that is attachable to a surface of the vehicle interior to form the composite trim panel.

In one aspect of the invention, the inner layer is ethylene vinyl acetate (EVA) foam, and the outer layer is a textile fabric or a synthetic leather material.

In another aspect of the invention, the synthetic leather material is selected from the group of an expanded polyurethane material and an expanded PVC material.

In another aspect of the invention, the surface is selected from the group of a vehicle seat, an instrument panel, a headliner, and a vehicle door.

In another aspect of the invention, the composite trim panel has a molded surface feature that is compression-molded into the inner and outer layers.

In another aspect of the invention, the composite trim panel has a pocket and a zipper closure that is operable for opening and closing the pocket.

In another aspect of the invention, the composite trim panel has a lighting device that is connected to the zipper closure, and the zipper closure is at least partially constructed of a transparent material such that the lighting device is operable for illuminating the zipper closure.

In another aspect of the invention, the lighting device is a light-emitting diode (LED) device or an electro-luminescent (EL) ribbon.

In another aspect of the invention, a composite trim panel is provided for use with a vehicle interior, and includes an inner layer constructed of an EVA foam material and an outer layer forming an appearance surface. The inner and outer layers are compression-molded together to form the composite trim panel, which is attachable to a surface of the vehicle interior to form the flexible trim panel, with the surface being a vehicle seat, an instrument panel, or a vehicle door.

In another aspect of the invention, a vehicle interior includes a seat, an instrument panel, a door, a headliner, and at least one composite trim panel that is operatively connected to at least one of the seat, instrument panel, door and headliner. The composite trim panel is constructed of a compression-molded composite of thermoplastic foam and a synthetic outer layer.

In another aspect of the invention, the vehicle interior includes a transparent closure device that is operatively connected to the composite trim panel, and a lighting device operatively connected to the transparent closure device, with the lighting device having at least one variable property.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic cross-sectional illustration of a compression-molded thermoplastic foam/fabric composite material usable in constructing the composite trim panels of FIGS. 1 and 2;

FIG. 5 is a cross-sectional side view of the composite trim panels of FIGS. 1 and 2; and FIG. 6 is a perspective top/side view of a representative composite trim panel having a compression-molded surface feature.

DESCRIPTION OF THE PREFERRED EMBODIMENTS

Figure 1:
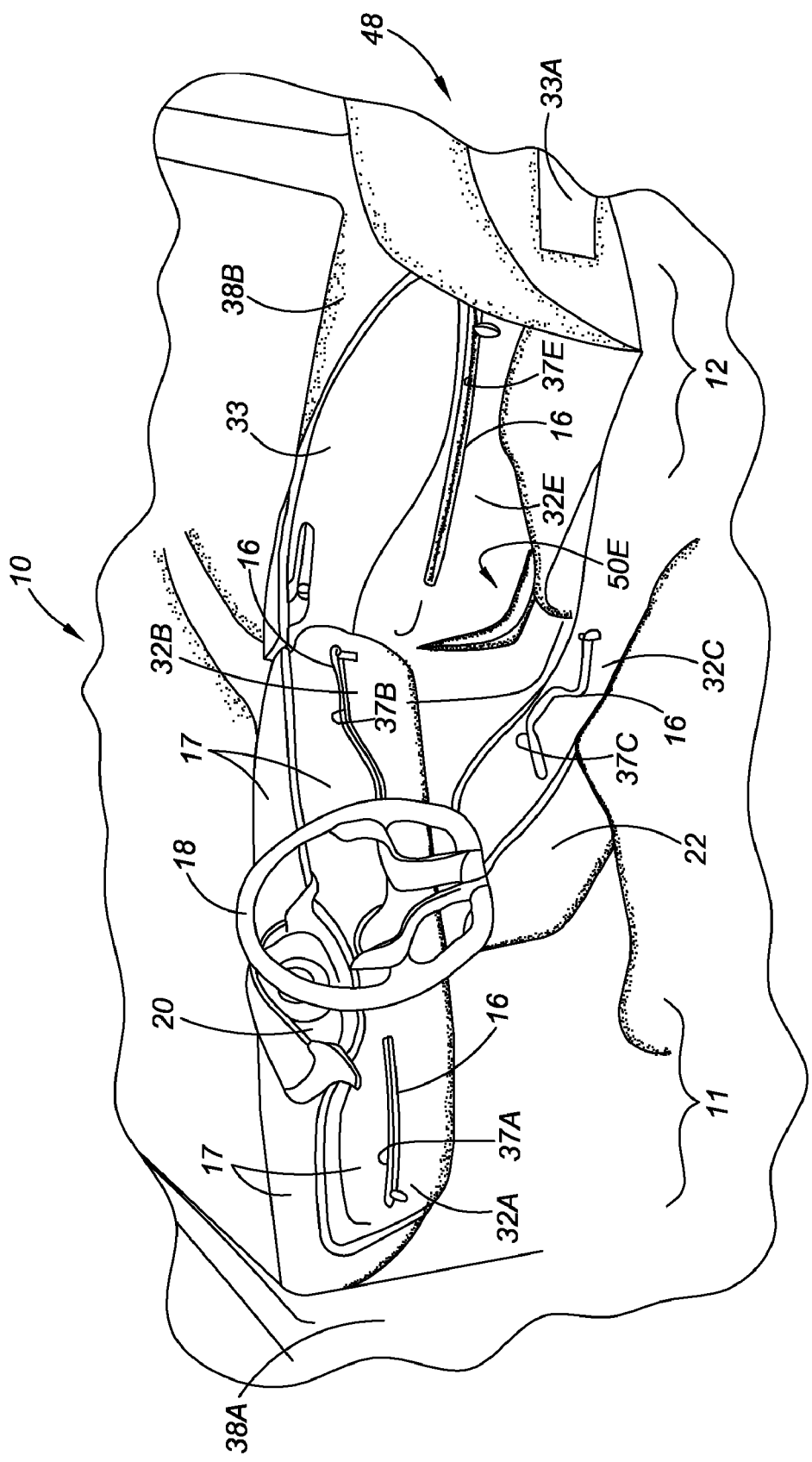
FIG. 1 is perspective view of a vehicle interior having an instrument panel, door panels, and a seat equipped with a composite trim panels in accordance with the invention.

With reference to FIG. 1, wherein like reference numerals refer to like components throughout the various figures, there is shown a passenger compartment or vehicle interior 10 having a driver side 11 and a passenger side 12, and at least one seat 48. A center console 22 is positioned approximately midway between the driver side 11 and the passenger side 12. An instrument panel 17 extends laterally across the vehicle interior 10 between a driver-side door 38A (also see FIG. 2) and a passenger-side door 38B. The driver side 11 is equipped with a steering wheel 18, which is positioned in proximity to a primary instrument cluster 20. The primary instrument cluster 20 may include various gauges and/or instrumentation, for example a speedometer, fuel gauge, battery charge gauge, odometer, and/or tachometer, as well as warning lights/lamps.

Figure 2:
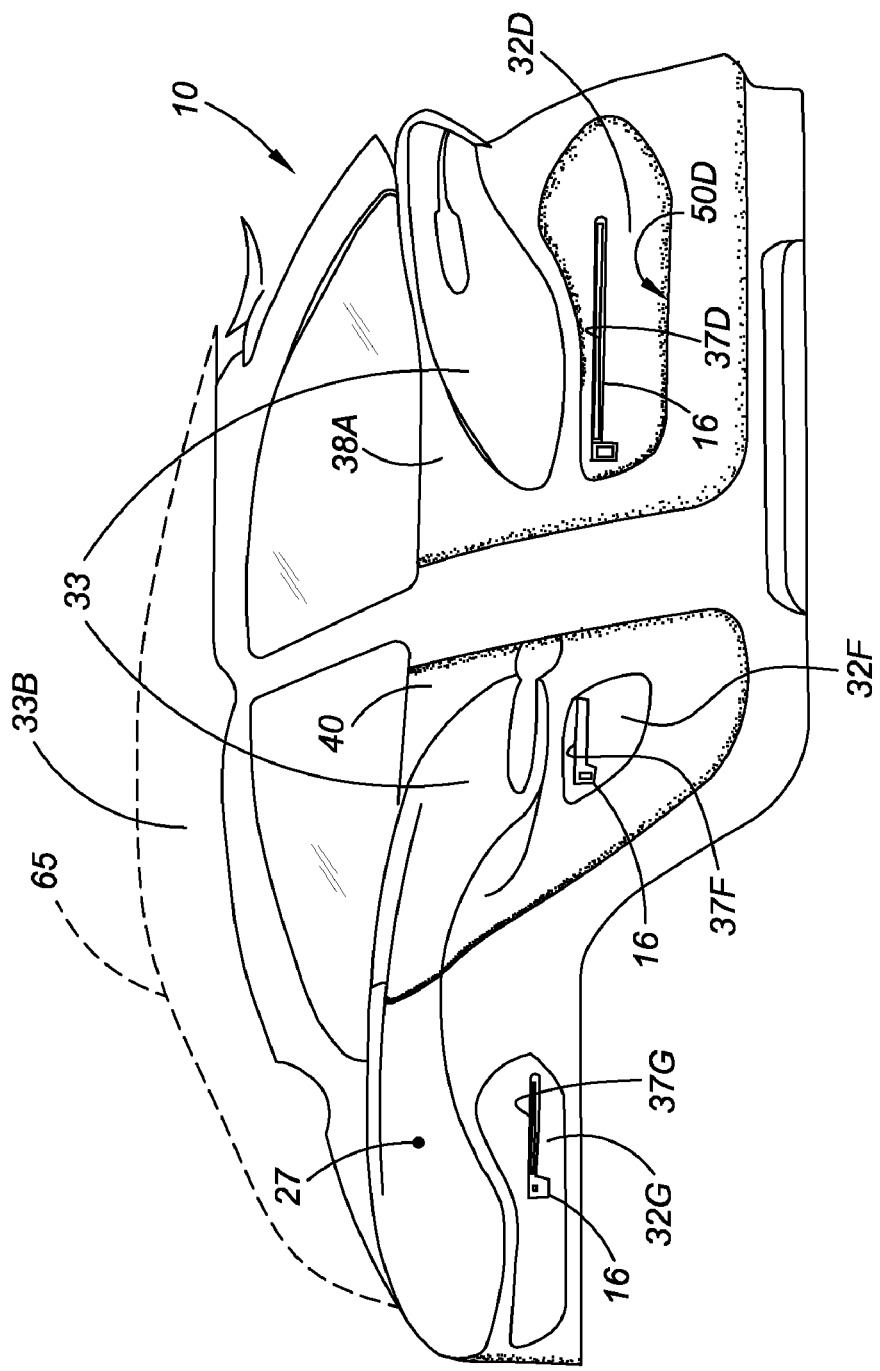
FIG. 2 is a perspective side view of the vehicle interior of FIG. 1, configured with additional composite trim panels.

As shown in FIGS. 1 and 2, the vehicle interior 10 further includes one or more composite trim panels 32A-G, 33, 33A, and/or 33B of the invention. The trim panels 32A-32G are referred to hereinafter as pocketed trim panels 32A-32G, while the trim panels 33, 33A, 33B are referred to hereinafter as closed trim panels 33, 33A, 33B. The vehicle interior may also include various map pockets 50D and 50E, i.e. open wells or pockets within a door 38A, 38B for holding maps or other materials. Each of the pocketed trim panels 32A-32G and the closed trim panels 33, 33A, 33B may be formed integrally with and/or operatively connected to any appropriate surface of the vehicle interior 10, such as the instrument panel 17, the center console 22, the headliner 65, the doors 38A, 38B, and 40, and/or the seat 48.

The pocketed trim panels 32A-32G may be placed or positioned throughout the vehicle interior 10 to provide multiple convenient storage locations. For example, one or more of the pocketed trim panels 32A, 32B may be attached to or formed with the instrument panel 17, while another pocketed trim panel 32C is attached to the center console 22. Likewise, one or more pocketed trim panels 32E may be attached to the passenger-side door 38B, with another pocketed trim panel 32D being attached to the driver-side door 38A (also see FIG. 2). Also as shown in FIG. 2, a rear passenger door 40 and/or a rear side panel 27 of the vehicle interior 10 may further include one or more pocketed trim panels 32F and 32G, respectively. Unless reference is made herein to a particular location of a pocketed trim panel 32A-32G, the pocketed trim panels 32A-32G will be referred collectively hereinafter for simplicity as the pocketed trim panels 32.

Referring to FIGS. 1 and 2, each pocketed trim panel 32, as well as each closed trim panel 33, 33A, 33B are substantially soft and/or flexible, that is, formed or constructed of a soft molded or pliable composite material described below, which may be shaped, configured, and/or sized as desired depending on the application within the vehicle interior 10. The softness and flexibility of the pocketed trim panels 32 and closed trim panels 33, 33A, 33B in turn minimizes the need to use heavy and/or space-consuming supports or substrates.

The configuration of the pocketed trim panels 32 ensures that each may be configured with a corresponding flexible opening 37A-37G, referred to collectively hereinafter as openings 37 for simplicity. Because of the substantially flexible design and pocket configuration of the pocketed trim panels 32, each of the pocketed trim panels 32 may in turn be closeable using a flexible closure device 16, for example a zipper closure, as will be explained below with reference to FIGS. 3A and 3B.

Referring to FIG. 1, within the driver side 11 of the vehicle interior 10, a pocketed trim panel 32A that is positioned on or within the instrument panel 17 may extend in a generally lateral direction between the steering wheel 18 and the driver-side door 38A, and is closeable using a flexible closure 16. Likewise, the substantially similar pocketed trim panel 32B may be positioned on the passenger side 12 to form a glove compartment, or an additional flexible storage compartment or pocket attached in proximity thereto. Another pocketed trim panel 32C may be formed or integrated with, or otherwise attached to, the center console 22 for storing or stowing other items, such as compact discs, glasses, maps, and/or other such objects.

Referring to FIG. 4, the pocketed trim panels 32, as well as the closed trim panels 33, 33A (see FIG. 1) and 33B (see FIG. 2) are formed from a compression-molded composite of at least one inner layer 74 of a semi-rigid expanded foam, such ethylene vinyl acetate (EVA) foam, cross-linked polyethylene, or a bio-based or renewably sourced foam material, and a pliable outer skin or layer 72, with the outer surface 72 and inner layer 74 or layers 74 and 74A being co-molded with sufficient heat and pressure using a common tool. The outer layer 72 may be a synthetic fabric, such as cloth or other fabric or a synthetic leather material such as thermoplastic resin and/or an elastomer, or other material suitable for closely approximating the look and feel of natural leather. The outer layer 72 may also utilize a bio-based or renewably sourced material such as corn in its construction. Natural materials such as leather may also be used within the scope of the invention, however such materials may exhibit a less than optimal response when subjected to the elevated temperature and pressure of a compression-molding process.

In one embodiment, a synthetic leather look and feel may be achieved using a material such as expanded polyvinyl chloride (PVC) synthetic leather or polyurethane (PU) synthetic leather, a suitable thermoplastic foam, or an elastomer in place of natural leather. The use of compression-molded EVA foam/fabric and/or EVA foam/synthetic leather composite materials allows for a consistent soft-molded appearance, surface flexibility, surface details or features, and/or sufficient rigidity as needed, as well as the ability to retain complex surface curvatures without having to be fixed to a hard or rigid substrate.

Figure 3A:
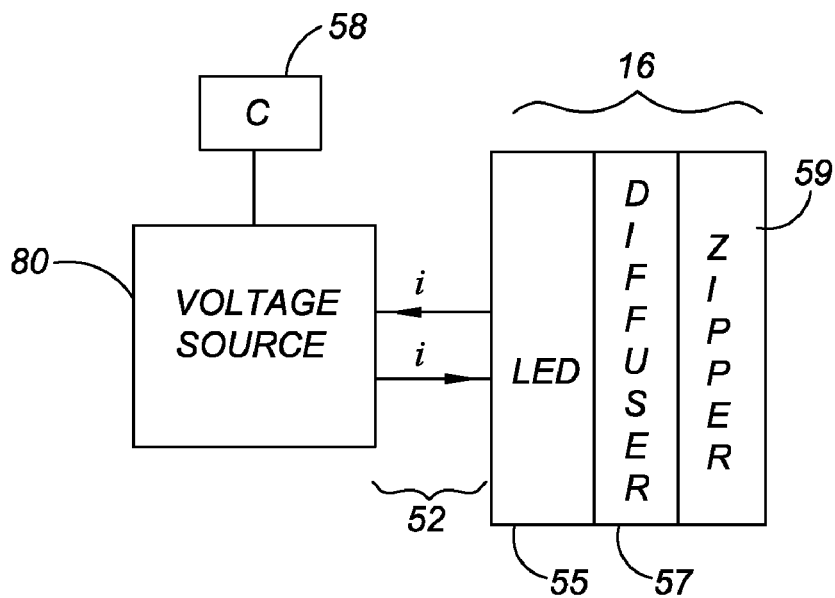
FIG. 3A is a schematic view of a closure device usable with the composite trim panels shown in FIGS. 1 and 2, and having a light-emitting diode and a diffuser.

Referring to FIG. 3A, in another embodiment a closure device 16 is configured of a substantially transparent material, and is electrically connected to the voltage source 80 and, if a more diffused lighting effect is desired, a transparent or translucent diffuser lens 57. A series of lights, such as the light-emitting diodes (LED) in the embodiment of FIG. 3A, are positioned adjacent the diffuser lens 57, and are electrically connectable to the voltage source 80 to form a loop or circuit 52 capable of delivering a sufficient amount of electrical current, represented by arrows i, for illuminating the LED 55. The output of the voltage source 80 is controllable via an integrated control unit or controller 58. The diffuser lens 57 may be configured to diffuse light in order to provide a uniform, continuous lighting effect along the entire length or expanse of the flexible closure device 16. Additionally, the LED 55 may be configured as a string or series of adjacent LED, or as an LED light pipe.

Figure 3B:
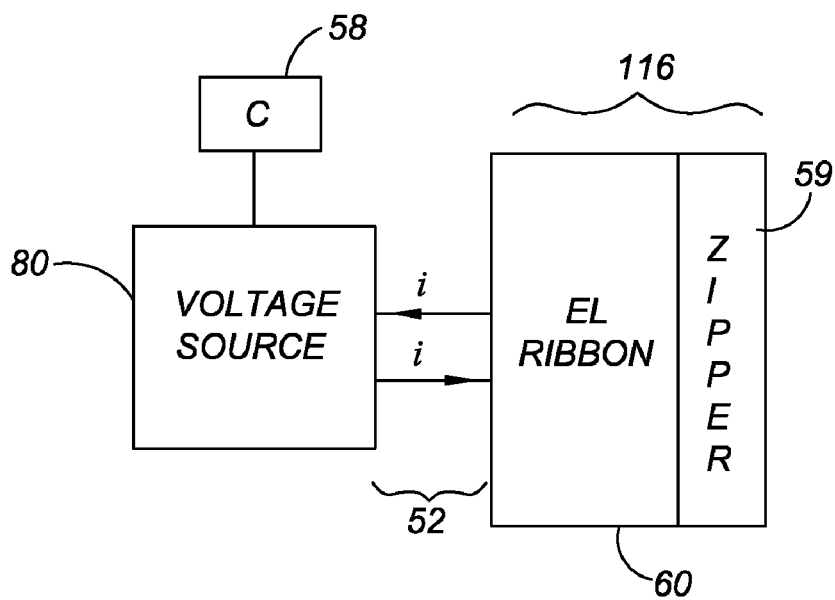
FIG. 3B is a schematic view of another flexible closure device having an electroluminescent ribbon.

Referring to FIG. 3B, in another embodiment an illuminable closure 116 has as its light or lighting source an electroluminescent (EL) ribbon 60, which is a band or strip of light-emitting material encased in a transparent or translucent material. The EL ribbon 60 emits visible light in response to the electrical current (arrows i) powered by the voltage source 80 in order to provide a uniform, continuous lighting effect as described hereinabove.

With either of the embodiments of FIGS. 3A and 3B, a transparent or translucent flexible closure device, referred to in FIGS. 3A and 3B as the zipper closure 59, but which also may be configured as another closure device such as hook-and-loop (not shown), is used to close the openings 37 of each of the corresponding pocketed trim panels 32 (see FIGS. 1 and 2), and is positioned adjacently to the diffuser lens 57 (see FIG. 3A) or the EL ribbon 60 (see FIG. 3B) so that light emitted by the LED 55 or the EL ribbon 60 illuminates the corresponding opening 37 of the corresponding storage pocket 32 (see FIGS. 1 and 2) to which the LED 55 or EL ribbon 60 is attached. In this manner, the location of each of the pocketed trim panels 32 is easily locatable or identifiable, particularly at night or during other low light conditions.

Additionally, when the zipper closure 59 or other similarly configured flexible closure device is opened, any light emitted from the LED 55 (see FIG. 3A) or from the EL ribbon 60 (see FIG. 3B) at least partially illuminates the interior of the pocketed trim panel 32 to which the flexible closure device 16, 116 is attached, while also providing useful ambient lighting within the vehicle interior 10 (see FIG. 1). Using the controller 58, which may be configured as a simple on/off switching device, a dimmer switch/rheostat, or a more advanced programmable device, the intensity, brightness, and/or color of the light emitted from the LED 55 or the EL ribbon 60 lighting devices may be varied as desired to change or customize the appearance of the emitted light.

Referring again to FIG. 4, a schematic cross-sectional view of a portion of a pocketed trim panel 32 shows the various layers of the compression-molded foam/synthetic fabric material design, as described above. While a pocketed trim panel 32 is shown, the following description applies equally to the closed trim panels 33, 33A (see FIGS. 1 and 2). Arrow A represents the ordinary perspective of one viewing the pocketed trim panel 32, such as an occupant of the vehicle interior 10 (see FIGS. 1 and 2). The outer surface 70 of an outer layer 72 functions as the show surface or the appearance surface, i.e. the surface that is most visible within the vehicle interior 10. This material may be selected from a compatible textile fabric, or from a synthetic version of natural leather simulating the appearance thereof, so as to match or compliment the design of the vehicle interior 10. The outer layer 72 has a thickness $x_1$, and is co-molded in a compression molding process with an inner layer 74 of EVA foam having a thickness $x_2$.

Thickness $x_2$ may be as thin or as thick as needed for the particular function, or may be varied at different areas of the pocketed trim panel 32 as needed. To provide rigidity when needed, a solid substrate or layer 76 having a thickness $X_3$, shown in phantom, may be formed with or connected to the inner layer 74. Finally, an additional second inner layer 74A may be connected to the solid layer 76 if an additional thickness $x_4$ is needed. In this manner, the pocketed trim panel 32 (see FIGS. 1 and 2) may be constructed with sufficient strength and size, while still providing openings 37 (see FIGS. 1 and 2) that are usable with the illuminable flexible closure devices 16, described above.

Referring to FIG. 5, for illustrative purposes a pocketed trim panel 32 is shown in cross-sectional side view operatively connected to a door 38, i.e. either the driver or passenger doors 38A, 38B, respectively. However, any surface of the vehicle interior 10 (see FIGS. 1 and 2) may be used instead of the door 38, such as a surface of the instrument panel 17 or seat 48 (see FIG. 1). The pocketed trim panel 32 has an upper portion 32U and a lower portion 32L, with the interface therebetween defining the opening 37. The flexible closure device 16 is operable for securing, joining, or connecting the respective upper and lower portions 32U, 32L to alternately close and open the opening 37. The pocketed trim panel 32, being flexible, has a cavity 90 with a variable or collapsible volume, represented by the arrows B. That is, when empty the pocketed trim panel 32 may be partially or fully collapsed to reduce the volume (arrows B) of the cavity 90, and expanded or increased when filled or occupied by an object 51, such as a map, gloves, service manual, flashlight, etc.

Referring to FIG. 6, a closed trim panel 33 is shown attached to a door 38, or any other suitable surface within the vehicle interior 10 (see FIG. 1), as described above. The closed trim panel 33 may be compression-molded with a first surface feature 41, shown as an embossed logo (L), and/or a surface feature 41A such as fluting, ribbing, contour, surface curvature, or other shape to form a panel suitable for use with the instrument panel 17, and/or the doors 38A, 38B, and/or 40 (see FIGS. 1 and 2), while an alternate closed trim panel 33A (see FIG. 1) or a pocketed trim panel 32 (see FIG. 5) could also be attached to or formed integrally with the back of a seat 48 (see FIG. 1).

While the best modes for carrying out the invention have been described in detail, those familiar with the art to which this invention relates will recognize various alternative designs and embodiments for practicing the invention within the scope of the appended claims.

The invention claimed is:

1. A composite trim panel for use in a vehicle interior, the composite trim panel defining a cavity with a collapsible volume and comprising:
   an inner layer constructed of an expanded foam material;
   an outer layer forming an appearance surface; and
   a flexible closure device;
   wherein the composite trim panel is substantially flexible, and has each of an upper portion and a lower portion together defining an opening at an interface between said upper portion and said lower portion, with said opening being alternately opened and closed via the flexible closure device, and wherein said inner layer and said outer layer are compression-molded together to form the composite trim panel, the composite trim panel being attachable to a surface of the vehicle interior.

2. The composite trim panel of claim 1, wherein said expanded foam material is one of: ethylene vinyl acetate (EVA), cross-linked polyethylene, and a renewably sourced foam material, and wherein said outer layer is one of a textile fabric, a renewably sourced material, and leather.

3. The composite trim panel of claim 1, wherein said expanded foam material is ethylene vinyl acetate (EVA) and said outer layer is a synthetic leather material.

4. The composite trim panel of claim 3, wherein said synthetic leather material is selected from the group of a thermoplastic polyurethane material and a thermoplastic polyvinyl chloride (PVC) material.

5. The composite trim panel of claim 1, wherein said surface is selected from the group of a vehicle seat, a center console, a headliner, an instrument panel, and a vehicle door.

6. The composite trim panel of claim 1, further comprising a molded surface feature, wherein said molded surface feature is compression-molded into both of said inner layer and said outer layer.

7. The composite trim panel of claim 1, wherein said flexible closure is configured as a zipper closure.

8. The composite trim panel of claim 7, further comprising a lighting device that is operatively connected to said zipper closure;
   wherein said zipper closure is at least partially constructed of a transparent material, and wherein said lighting device is operable for illuminating said zipper closure.

9. The composite trim panel of claim 8, wherein said lighting device is selected from the group of a light-emitting diode (LED) device and an electro-luminescent (EL) ribbon.

10. A composite trim panel for use with a vehicle interior, the composite trim panel comprising:
- an inner layer constructed of a thermoplastic foam material;
- an outer layer forming an appearance surface, wherein said outer layer defines a collapsible pocket in conjunction with said inner layer; and
- a flexible closure device adapted for closing a flexible opening defined at an interface between said inner layer and said outer layer;
- wherein said inner layer and said outer layer are compression-molded to form the composite trim panel that is attachable to a surface of the vehicle interior, said surface being selected from the group of a vehicle seat, a center console, an instrument panel, and a vehicle door.

11. The composite trim panel of claim 10, wherein said outer layer is selected from the group of a textile fabric and a synthetic leather material.

12. The composite trim panel of claim 11, wherein said outer layer is said synthetic leather, and wherein said synthetic leather is selected from the group of a thermoplastic polyurethane material and a thermoplastic PVC material.

13. The composite trim panel of claim 10, further comprising a molded surface feature, wherein said molded surface feature is compression-molded into both of said inner layer and said outer layer.

14. The composite trim panel of claim 10, wherein the flexible closure device is a zipper closure operable for opening and closing said flexible opening.

15. The composite trim panel of claim 14, wherein said zipper closure is at least partially constructed of transparent material, and is selectively illuminable using a lighting source that is operatively connected to said zipper closure.

16. A vehicle interior comprising:
- a seat;
- an instrument panel;
- a door;
- a flexible closure device; and
- at least one composite trim panel defining a cavity with a collapsible volume, and that is operatively connected to at least one of said seat, said instrument panel, and said door;
- wherein said at least one composite trim panel is substantially flexible, and has each of an upper portion and a lower portion together defining an opening at an interface formed between said lower and said upper portion, said opening being alternately opened and closed and via the flexible closure device, and wherein said composite trim panel is constructed of a compression-molded composite of a thermoplastic foam material and a synthetic outer layer.

17. The vehicle interior of claim 16, wherein said thermoplastic foam material is one of ethylene vinyl acetate (EVA) foam, cross-linked polyethylene, and a renewably sourced foam material, and wherein said synthetic outer layer is one of a textile fabric and an expanded synthetic material.

18. The vehicle interior of claim 17, wherein said flexible closure assembly is transparent, and is operatively connected to said at least one composite trim panel, the vehicle interior further comprising
- a lighting device operatively connected to said flexible closure device and operable for backlighting said flexible closure device.

19. The vehicle interior of claim 18, wherein said lighting device is selected from the group of a light-emitting diode (LED) device and an electro-luminescent (EL) ribbon.

* * * * *